United States Patent
Paton et al.

(10) Patent No.: US 10,768,121 B2
(45) Date of Patent: Sep. 8, 2020

(54) METHODS, APPARATUS, AND SYSTEMS FOR INSPECTING HOLES IN TRANSPARENT MATERIALS

(71) Applicant: The Boeing Company, Chicago, IL (US)

(72) Inventors: Elizabeth Ann Paton, St. Louis, MO (US); Roger W. Engelbart, St. Louis, MO (US); Christopher M. Vaccaro, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 261 days.

(21) Appl. No.: 15/986,648

(22) Filed: May 22, 2018

(65) Prior Publication Data
US 2019/0360945 A1 Nov. 28, 2019

(51) Int. Cl.
*G01N 21/958* (2006.01)
*G01N 21/954* (2006.01)
*G01N 21/59* (2006.01)
*G01N 21/88* (2006.01)

(52) U.S. Cl.
CPC .......... *G01N 21/958* (2013.01); *G01N 21/59* (2013.01); *G01N 21/8806* (2013.01); *G01N 21/954* (2013.01); *G01N 2021/8841* (2013.01); *G01N 2021/9542* (2013.01)

(58) Field of Classification Search
None
See application file for complete search history.

(56) References Cited

U.S. PATENT DOCUMENTS

| | | | | |
|---|---|---|---|---|
| 7,843,641 | B2* | 11/2010 | Miener | G01N 21/958 348/115 |
| 9,157,869 | B2* | 10/2015 | Ortner | G01N 21/9505 |
| 2007/0165213 | A1* | 7/2007 | Fang | G01N 21/958 356/239.1 |
| 2010/0271811 | A1* | 10/2010 | Miener | G01N 21/958 362/138 |
| 2015/0055757 | A1* | 2/2015 | Engelbart | G01B 15/02 378/89 |

FOREIGN PATENT DOCUMENTS

WO   WO-2011017772 A1 *  2/2011 ............. H01L 22/12

OTHER PUBLICATIONS

ASTM International, F2108-17, Standard Practice for Inspection of Transparent Parts by Prism, Jun. 1, 2017, 7 pages.

* cited by examiner

Primary Examiner — Kara E. Geisel
Assistant Examiner — Jarreas C Underwood
(74) Attorney, Agent, or Firm — Kolisch Hartwell, P.C.

(57) ABSTRACT

Methods, systems, and apparatus for detection of a condition in a hole defined by a transparent material that is at least partially enclosed by one or more substantially opaque materials. The method may include positioning a light source in a first hole in the transparent material, directing light from the positioned light source through the transparent material and toward a second hole that is adjacent to the first hole. A prism may be positioned so that the light transmitted from the light source through the machined inner surface of the second hole is visible through a viewing face of the prism. By observing the transmitted light, a surface condition of the machined inner surface of the second hole may be determined.

21 Claims, 9 Drawing Sheets

METHODS, APPARATUS, AND SYSTEMS FOR INSPECTING HOLES IN TRANSPARENT MATERIALS

FIELD

This disclosure relates to methods, apparatus, and systems for inspecting holes machined in transparent materials. More specifically, the disclosed embodiments relate to methods, apparatus, and systems for detecting crazing in the surfaces of holes machined in transparent materials.

INTRODUCTION

Many polymeric materials, and in particular glassy polymers, may be susceptible to a phenomenon known as "crazing." Sometimes created intentionally in ceramic glazes, crazing is the formation of a network of fine cracks on the surface of the material, typically invisible to the naked eye. Crazing is typically the result of high hydrostatic tension or very localized yielding. Although the resulting defects in the material are shallow and microscopic, when a crazed material is placed under stress the microvoids might elongate and coalesce, resulting in the formation of macroscopic cracks, potentially leading to the failure (fracture) of the material.

Transparent materials used in the aerospace industry, such as those utilized in aircraft canopies, may be subject to crazing when exposed to mechanical stresses, such as when holes are drilled in the material for the insertion of a fastener. The detection of crazing in fastener holes is important, because it may be an indicator of a problem in the manufacturing process. For example, the formation of crazing may indicate the use of improper drilling techniques, such as using an inappropriate drill speed, pressure, or feed rate. The presence of crazing should therefore be detected promptly so that the manufacturing process may be corrected as soon as possible.

Unfortunately, the use of visual inspection of fastener holes is problematic, as the naked eye is typically unable to differentiate the presence of crazing from the scratches and abrasion due to normal machining processes. Additionally, many transparent materials used in aerospace construction may be enclosed by additional and typically opaque materials, such as for example where a transparent panel is sandwiched at its edges by an aluminum frame. Such junctions may also routinely be covered by one or more sealant compositions.

Inspection of such holes is currently performed using a borescope, which includes a rigid metallic sleeve containing an optical fiber for illumination and terminating in a small lens for imaging the area of interest. The inspection is performed by inserting the lens of the borescope into a hole, and adjusting focus until the area of interest is in sharp focus. Unfortunately, such borescope may provide a view of a very small area of interest, and feature a very shallow depth of field, both of which prove disadvantageous when attempting to detect and/or identify crazing condition: At very close proximities, it becomes impossible to differentiate crazing from the normal surface abrasions caused by the machining process.

What is needed is an apparatus that will rapidly, accurately, and inexpensively detect crazing of fastener holes in transparent materials, speeding production, reducing manufacturing inconsistencies, and ultimately reducing labor costs. More preferably, what is needed is such an apparatus that additionally lends itself to automated processes so that component assembly and inspection can be accomplished in an uninterrupted one-up assembly process.

SUMMARY

The present disclosure provides methods, apparatus, and systems for inspecting holes in transparent materials, and in particular for detecting crazing within holes formed in transparent materials.

In some embodiments, the disclosure may provide a method that includes positioning a light source in a first hole, where the first hole is defined by an object of manufacture having a transparent material at least partially enclosed by one or more substantially opaque materials. The method may further include directing light from the positioned light source through the transparent material and toward a second hole that is also defined by the object of manufacture, and that is adjacent to the first hole, where the second hole is defined by a machined inner surface. The method may further include positioning a prism that has a viewing face adjacent to the transparent material, so that the light transmitted from the light source through the machined inner surface of the second hole is visible through the viewing face of the prism. The method may include observing the transmitted light, and then determining a surface condition of the machined inner surface of the second hole based on the observed light transmitted through the viewing face.

In some embodiments, the disclosure may provide an apparatus that includes a sleeve that is sized to be received in a first fastener hole of an object of manufacture that includes a transparent material that is at least partially enclosed in one or more substantially opaque materials. The sleeve may have a hollow portion that is sized to receive a light source, and also include a cut-out portion configured to direct light from the light source through the transparent material when the sleeve is received in the first fastener hole and the light source is received in the hollow portion. The cut-out portion may direct light through the transparent material and toward a second fastener hole that is adjacent to the first fastener hole, where the second fastener hole is defined by a machined surface. The apparatus may further include an adjustable arm that has first and second end portions, where the first end portion is connected to the sleeve and the second end portion is configured to support a viewing prism that has a viewing face. The apparatus may be configured so that light transmitted from the light source goes through at least a portion of the machined surface of the second fastener hole and through the viewing face of the prism when the sleeve is received in the first fastener hole, when the light source is received in the hollow portion, and when the prism is disposed adjacent the transparent material.

In some embodiments, the disclosure may provide a system including a robotic arm, a controller assembly configured to control the robotic arm, and an inspection apparatus attached to the robotic arm. The inspection apparatus may include a sleeve that is sized to be received in a first fastener hole of an object of manufacture that includes a transparent material that is at least partially enclosed in one or more substantially opaque materials. The sleeve may have a hollow portion that is sized to receive a light source, and also include a cut-out portion configured to direct light from the light source through the transparent material when the sleeve is received in the first fastener hole and the light source is received in the hollow portion. The cut-out portion may direct light through the transparent material and toward a second fastener hole that is adjacent to the first fastener hole, where the second fastener hole is defined by a machined surface. The apparatus may further include a light source positioned in the hollow portion of the sleeve. The apparatus may additionally include an arm that has first and second end portions, where the first end portion is connected to the sleeve and the second end portion is configured to support a viewing prism that has a viewing face such that the viewing prism is disposed adjacent the transparent material when the sleeve is received in the first fastener hole. The apparatus may further include a viewing prism supported by the second end portion. The apparatus may be configured so that light transmitted from the light source goes through at least a portion of the machined surface of the second fastener hole and through the viewing face of the prism when the sleeve is received in the first fastener hole.

The disclosed features, functions, and advantages of the disclosed inspection methods, apparatus, and systems may be achieved independently in various embodiments of the present disclosure, or may be combined in yet other embodiments, further details of which can be seen with reference to the following description and drawings.

DESCRIPTION

The following definitions apply herein, unless otherwise indicated.

"Crazing" refers to both the phenomenon that produces a network of fine cracks on the surface of a material, such as the glaze layer of a ceramic, or surface of a glassy polymer, and the resulting network of cracks itself.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Crazing is perhaps best known as the network of fine cracks that may form in the glaze layer of a ceramic, either intentionally or accidentally. However, crazing can also occur at the surface of a glassy material such as a glassy thermoplastic, particularly when it is being machined.

Figure 1:
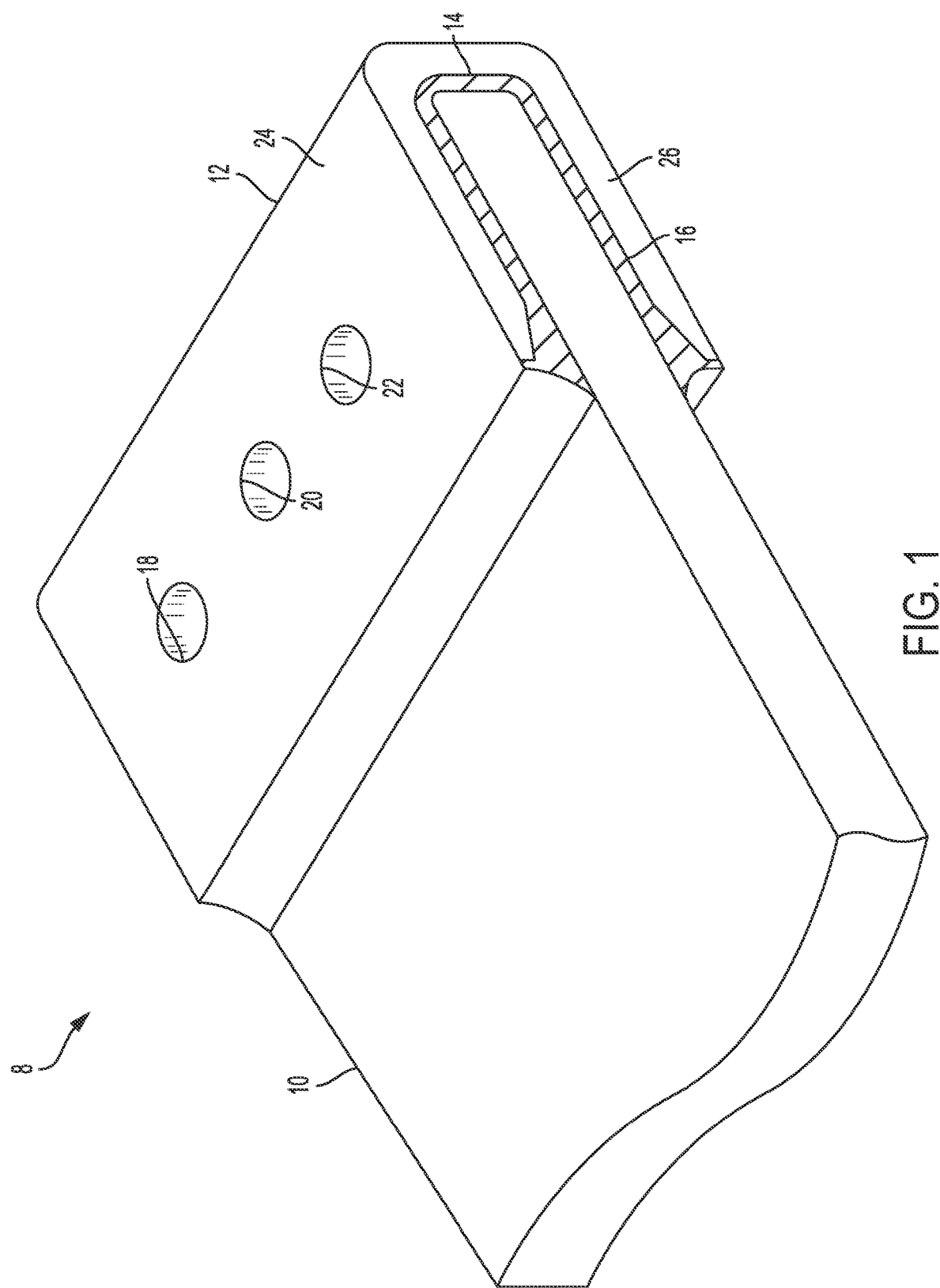
FIG. 1 depicts a portion of an object of manufacture including a transparent material partially enclosed by an opaque material, including three machined holes.

FIG. 1 depicts a portion of a panel 8, that includes a pane 10 of at least substantially transparent material mounted in a frame or rail 12. As shown by the cross-section, pane 10 is disposed within a complementary recess 14 formed in rail 12. Pane 10 may then be secured within rail 12 by application of an appropriate sealant 16. Rail 12 may enclose one or more sides of pane 10, or may extend around the periphery of pane 10.

Although described herein in the context of aerospace manufacture, it should be appreciated that the disclosed apparatus, systems, and methods may be applicable to any industry in which detection of crazing may be advantageous, and should not be limited to aircraft or aircraft construction.

Pane 10 may include any at least substantially transparent material, and in particular may include various thermoplastic polymer resins and thermoset polymer resins. Where pane 10 includes a thermoplastic resin, the thermoplastic resin may include high-density polyethylene (HDPE) resin, or polycarbonate resin, among others. Where pane 10 includes a thermoset resin, the thermoset resin may include a polyester resin, an epoxy resin, a phenolic resin, or a urethane resin, among others.

Rail 12 may include a metal, particularly a lightweight metal such as aluminum. Alternatively, rail 12 may be a composite structure, such as a carbon fiber composite structure.

Sealant 16 may be any sealing composition having the appropriate physical properties to provide effective sealing of the pane 10 to the rail 12. The sealant composition may be selected to undergo curing, either via the addition of an activating compound or catalyst, by the passage of time, or other mechanism. A variety of suitable sealant compositions are commercially available, including plastic sealants, rubber sealants, and varnishes, among many others. In one aspect of the present disclosure, the sealant composition may be a polysulfide-based synthetic rubber sealant, such as for example fast-curing BMS 5-45 polysulfide sealant.

Figure 2:
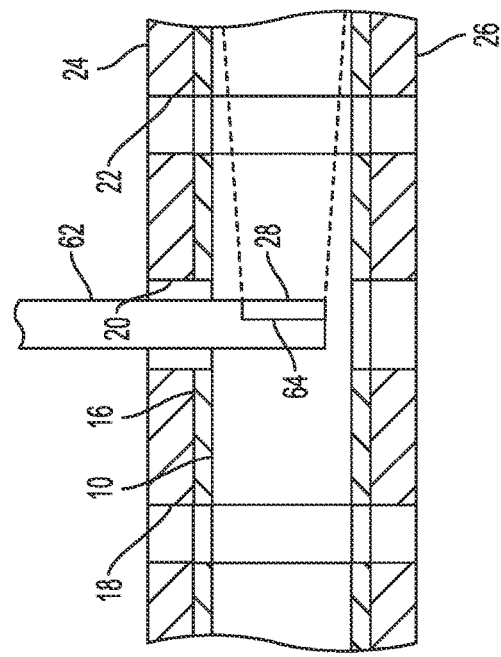
FIG. 2 is a partial cross-section view of the object of manufacture of FIG. 1 that includes the three machined holes, showing a light source inserted into the central machined hole.

As shown in FIG. 1, pane 10 is enclosed along one edge by rail 12, and a representative trio of holes 18, 20, and 22 are depicted. Holes 18, 20, and 22 may be machined in the sandwich edge structure after it is formed, and therefore extend through a first side 24 of rail 12, through the width of pane 10, and through a second side 26 of rail 12. Although the present disclosure will employ an exemplary panel 8 that includes holes that extend throughout the panel, it should be appreciated that the present methods, apparatus and systems may be used to inspect holes machined in panels that do not extend completely through the entirety of the panel of FIG. 1, including pane 10 and rail 12. The holes 18, 20, and 22 may be machined in panel 8 for any appropriate reason. In one aspect of the disclosure, holes 18, 20, and 22 are machined in panel 8 in preparation for receiving a fastener to secure panel 8 to another component.

Where a hole to be inspected is a hole for receiving a fastener, the intended fastener may be for example a nail, a bolt, a pin, or a screw, among other conventional fasteners. Alternatively or in addition, the fastener may include a hardware assembly having multiple individual pieces of hardware, such as for example an anchor used to retain a bolt in place, a nut, a collar, or a spacer to occupy a defined space for the fastener installation.

Where the material of pane 10 is at least possibly prone to crazing, an inspection of the holes machined into pane 10 may be required to detect any crazing on the inner surfaces of holes 18, 20, and 22. As shown in FIG. 2, a light source 28 may be inserted into hole 20 and positioned so as to illuminate an adjacent hole, in this case hole 22. Although the inner surface 30 of hole 22 is now illuminated, it cannot be directly examined by eye, as sides 24 and 26 of rail 12 extend along the surface of pane 10 sufficiently far that direct examination of the illuminated hole 22 is not possible. However, the presence of crazing may be detected in inner surface 30 of hole 22 by employing refractive observation, that is via a prism 32 placed on a surface 34 of pane 10 adjacent to hole 22, as shown in FIG. 3.

Considering the index of refraction of the pane material, the angle of incidence, and the distance from the hole 22, an appropriate prism geometry may be calculated that permits viewing the desired portion of the interior of pane 10 using Snell's Law, or the law of refraction. Snell's law describes the refraction of light at the interface between two media having different refractive indices, and states that the ratio of the sines of the angles of incidence and refraction is equivalent to the ratio of phase velocities in the two adjacent media, or equivalent to the reciprocal of the ratio of the indices of refraction.

Figure 3:
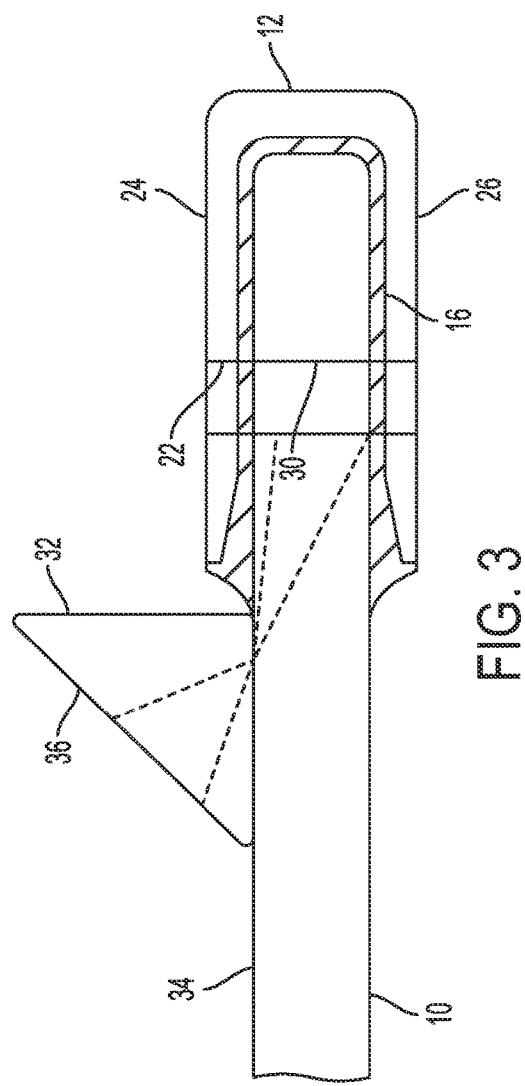
FIG. 3 is a cross-section view of the object of manufacture of FIG. 1 with a prism disposed on the surface of the transparent material so as to view an inner surface of a machined hole.

For the purposes of illustration, a right triangular prism 32 having 90°, 45°, and 45° angles is shown disposed on surface 34 of pane 10 in FIG. 3. The image of hole 22 may be refracted through the pane 10, across the interface between pane 10 and prism 32, and through prism 32 as indicated in FIG. 3. As a result, an image of hole 22 may be observed on a viewing surface (or face) 36 of prism 32.

Figure 4:
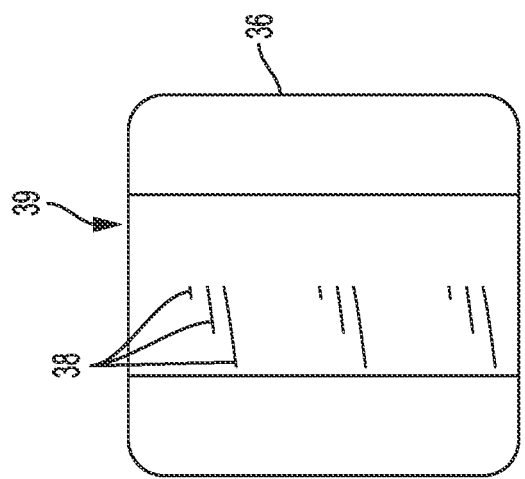
FIG. 4 is a semi-schematic depiction of a view of an inner surface of a machined hole showing surface markings.
Figure 5:
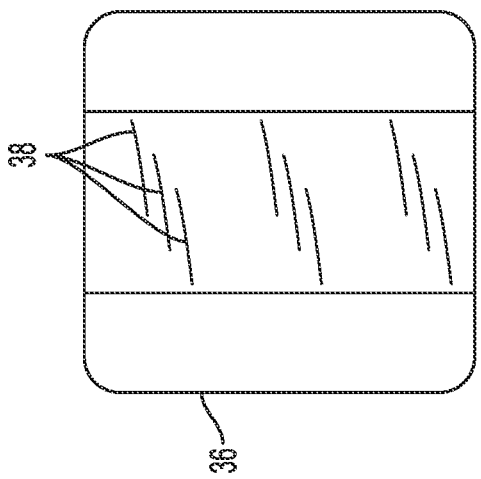
FIG. 5 is a semi-schematic depiction of a view of an inner surface of a machined hole showing crazing in the inner surface.

Although the naked eye is not typically capable of discerning the presence of crazing, the fine microstructure of cracks that is created by crazing has a distinctive scattering effect on incident light. That is, in the absence of crazing the image of inner surface 30 of hole 22 may appear distinct, and even reveal evidence of the machining process, such as scratches 38, as represented by FIG. 4. However, where inner surface 30 is crazed, the incident light from adjacent hole 20 may be scattered by reflection from the finely spaced cracks in inner surface 30, resulting in a diffuse illumination of hole 22 on a side opposite the direction of illumination, as indicated by the stippling 39 shown in FIG. 5.

By illuminating a hole from the side and inspecting it using refractive observation, the presence of crazing in a machined hole in pane 10 may be readily detected, even with the naked eye. The sharp and distinct image of a hole surface (as in FIG. 4) is readily distinguished from the diffuse illumination due to light scattering (as in FIG. 5), and may be directly correlated with the existence of surface crazing of the hole.

Aspects of a hole inspection method are provided in the method steps described below. Where appropriate, reference may be made to previously described components and systems that may be used in carrying out each step, and further components may be described with regard to the examples below. These references are for illustration, and are not intended to limit the possible ways of carrying out any particular step of the method.

Figure 6:
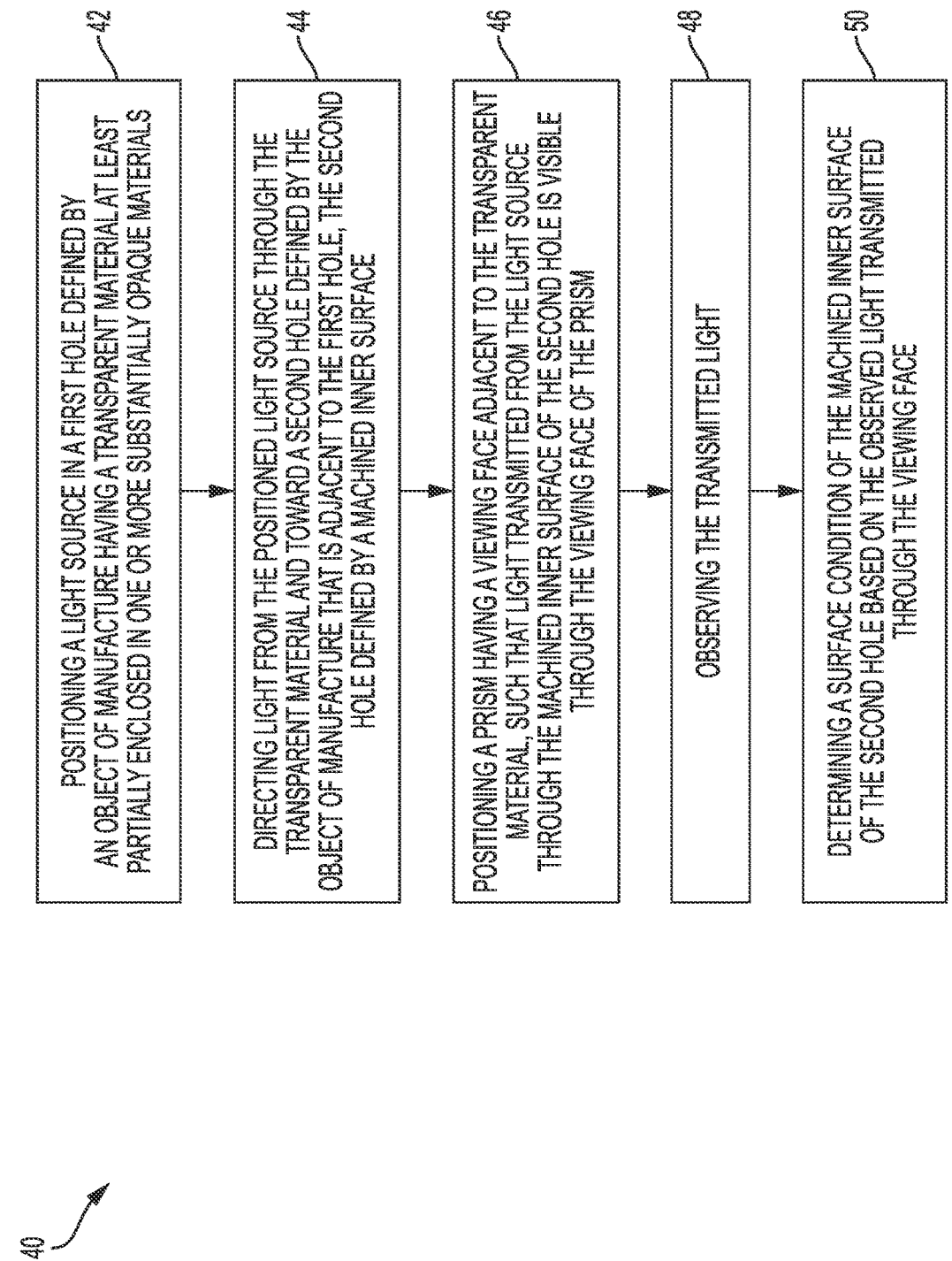
FIG. 6 is a flowchart representing a method according to the present disclosure.

FIG. 6 depicts a flowchart 40 illustrating operations or steps performed in the illustrative method. Although various steps of method 40 are described below and depicted in FIG. 6, the steps need not necessarily all be performed, and in some cases may be performed in a different order than the order shown. The method may include positioning a light source in a first hole defined by an object of manufacture having a transparent material at least partially enclosed in one or more substantially opaque materials, at 42 of flowchart 40. The method may further include directing light from the positioned light source through the transparent material and toward a second hole defined by the object of manufacture that is adjacent to the first hole, the second hole defined by a machined inner surface, at 44 of flowchart 40. The method may further include positioning a prism having a viewing face adjacent to the transparent material, such that light transmitted from the light source through the machined inner surface of the second hole is visible through the viewing face of the prism, at 46 of flowchart 40. The method may further include observing the transmitted light, at 48 of flowchart 40. The method may further include determining a surface condition of the machined inner surface of the second hole based on the observed light transmitted through the viewing face, at 50 of flowchart 40.

In some aspects of the present disclosure, the combination of the index of refraction of the material of pane 10, the length of the sides of rail 12, the configuration of the prism, and the size of the machined hole in panel 8 may result in an inability to observe the entire inner surface of a given hole. In such situations, it may be useful to first observe the image on the viewing face of the prism resulting from the light source illuminating a first portion of the machined inner surface 30 of hole 22 when the prism is in a first location on pane 10, and then positioning the prism adjacent to the hole 22 in a second location different from the first location, and observing the image on viewing face 36 of prism 32 resulting from the light source illuminating a second portion of the machined surface 30 of hole 22. In selected embodiments, the first and second portions of the machined surface of the hole are different. In a particular example of the present disclosure, the first location may be on a first surface 34 of pane 10, and the second location may be on a second and opposing surface of pane 10. In additional embodiments, the first and second portions of the machined surface of the hole in combination define the machined surface of the hole.

Although the presence or absence of crazing in a hole under observation may be determined without instrumental assistance, crazing may also be detected by measuring a percentage of the light transmitted from light source 28 through surface 30 and then through the viewing face 36 of prism 32. The measured amount of light transmitted to the viewing face 36 may then be compared to a precalculated acceptable range of percentage of light transmission. A measured percentage of light transmitted to the viewing face 36 that falls outside the predetermined acceptable range is correlated with the presence of a crazing condition in and on surface 30. The precalculated acceptable range of percentage light transmission is determined by measuring percentage light transmission for correctly drilled holes (e.g., light source inserted in a correctly drilled hole and directed toward a correctly drilled adjacent hole). The transmission through the correctly drilled hole would be standardized at 50% and the precalculated acceptable range of percentage transmission would be 50%+/−10% to allow for normal variation among various correctly drilled holes. Any hole that transmits more than 60% light or less than 40% light would be considered outside the predetermined acceptable range and would be subject to further review. In other embodiments, the +/− tolerance for percentage transmission can be any applicable percentage range in accordance with design considerations, e.g., configuration, material, geometry, or the like.

By incorporating various instruments and or sensors, the presently disclosed method of hole inspection lends itself to automation, as will be discussed below.

Various aspects and examples of a hole inspection method, hole inspection apparatus, and hole inspection systems are described below and illustrated in the associated drawings. Unless otherwise specified, a hole inspection apparatus and/or its various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

EXAMPLES, COMPONENTS, AND ALTERNATIVES

The following sections describe selected aspects of exemplary hole-inspecting apparatus, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

Example 1

This example describes an illustrative hole-inspection apparatus.

Figure 7:
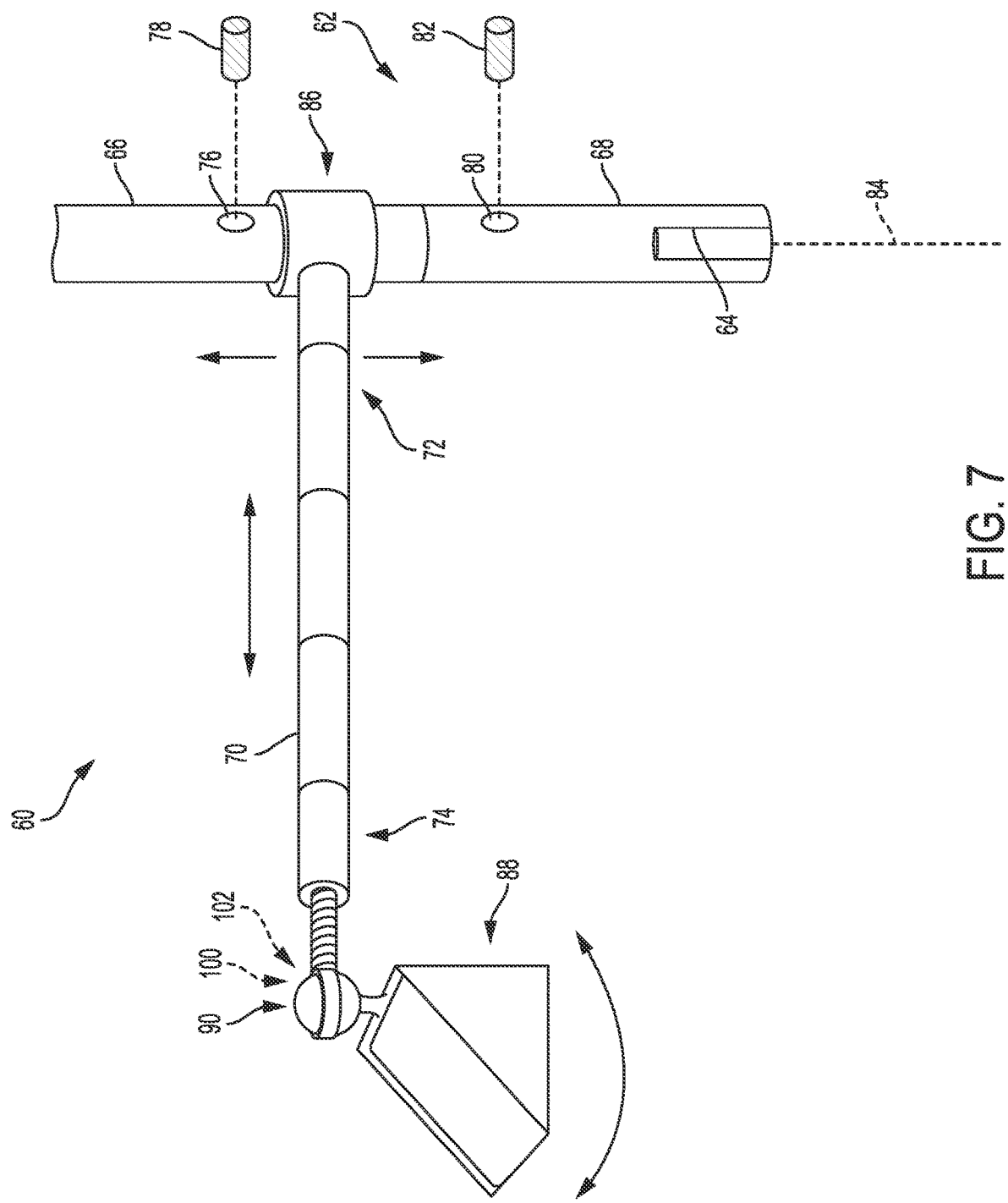
FIG. 7 depicts an illustrative apparatus according to the present disclosure.

An apparatus 60 for the inspection of holes, and more particularly to detect crazing in such holes, is shown in FIG. 7. Apparatus 60 may be configured to be used primarily manually, that is, by an individual worker employing the apparatus as a hand tool.

Apparatus 60 includes a sleeve 62 sized to be received in a first fastener hole 18, 20, 22 of an object of manufacture, such as panel 8, having a transparent material 10 at least partially enclosed in one or more substantially opaque materials 12. Sleeve 62 includes a hollow portion sized to receive an internal light source 28, while sleeve 62 further defines a cut-out light port or portion 64 that permits light from light source 28 to be directed in a desired orientation. Sleeve 62 may include a first or upper portion 66 and second or lower portion 68, where cut-out light port 64 is defined by second portion 68. First portion 66 and second portion 68 may be discrete from each other, and first portion 66 may be configured to pivot relative to second portion 68. Second portion 68 may be configured so that it is removable, and a second portion 68 that is sized appropriately for insertion into the first fastener hole may be attached to apparatus 60.

Apparatus 60 may further include an arm 70 having a first end portion 72 and a second end portion 74, where first end portion 72 of arm 70 is coupled to first portion 66 of sleeve 62, and second end portion 74 is configured to support viewing prism 32 having viewing face 36. Viewing prism 32 may be supported flexibly by second end portion 74, so that prism 32 may be rotated and pivoted as needed to achieve a desired orientation.

In one aspect of the disclosed apparatus, the first sleeve portion 66 defines an aperture 76 sized to receive a first fastener 78, where fastener 78 may be configured to secure light source 28 to first sleeve end portion 66. Similarly, second sleeve portion 68 may define another aperture 80 sized to receive a second fastener 82, where fastener 82 may be configured to secure light source 28 to second sleeve portion 68.

Alternatively, or in addition, arm 70 may be an adjustable arm, such as telescopically extendable and/or retractable. Sleeve 62 may define a longitudinal axis 84, and adjustable arm 70 may be telescopically extendable and retractable along an axis that is substantially perpendicular to longitudinal axis 84. When arm 70 is adjustable, the arm may be referred to as an "adjustable arm." Where arm 70 is telescopically extendable, arm 70 may include a plurality of telescoping tube members of decreasing diameter.

To facilitate further adjustability, arm 70 and sleeve 62 may optionally be joined via a coupling that incorporates a translation mechanism 86 that may be configured to permit translation of arm 70 along sleeve 62 parallel to longitudinal axis 84. Alternatively, arm 70 may be fixedly attached to the sleeve and not adjustable, such as when the inspection apparatus is attached to a robotic arm, as further discussed below.

Viewing prism 32 may be held or retained by a suitable retention mechanism, such as a cage, mount, or clamp 88. Clamp 88 may then be coupled to second end portion 74 of arm 70 via any suitable and adjustable coupling mechanism 90 that permits prism 32 to be readily positioned in an appropriate orientation so as to facilitate viewing of the hole under inspection. As depicted in FIG. 7 coupling mechanism 90 incorporates a ball joint to confer adjustability which, in combination with for example translation mechanism 86, permit a great deal of positional flexibility for prism 32. However, any other mechanism or mechanisms that serve to confer the desired positional flexibility on prism 32 may be suitable mechanisms for the purpose of the presently disclosed apparatus.

By virtue of the positional flexibility of apparatus 60, the apparatus 60 may be generally configured so that sleeve 62 may be disposed in a first fastener hole and second sleeve portion 68 may be rotated relative to the first end portion 72 of arm 70 in order to direct light from light source 28 through the material of pane 10 towards a second fastener hole, as shown in FIG. 2. Prism 32 may be positioned appropriately on surface 34 of pane 10 adjacent to the second hole so that light transmitted from light source 28 goes through at least a portion of a machined surface of the second fastener hole and through viewing face 36 of prism 32. In one aspect of the apparatus, the positioning of the prism 32 relative to sleeve 62 may be locked, so that a series of fastener holes having uniform spacing may be rapidly and sequentially inspected without readjusting the relative prism position.

Light source 28 may incorporate any suitable means of illumination that is sufficiently small in size to be incorporated within sleeve 62 and sufficiently bright to be useful for the presently disclosed hole inspection. For example, any light source that may be employed in a conventional borescope may also be suitable for use in the disclosed apparatus. In one aspect of the apparatus, light source 28 includes a rigid or flexible light pipe, such as a fiber optic, that serves to transmit light from a remote light source. In another aspect of the apparatus, light source 28 may include one or more LEDs, or a laser light source.

Typically, sleeve 62 is disposed within a first fastener hole and light source 28 is energized. Sleeve 62 may then be rotated until light from light source 28 is directed through the material of pane 10 toward a second fastener hole adjacent to first fastener hole 20. For example as shown in FIG. 2, sleeve 62 is inserted into first hole 20, and light source 28 is rotated until adjacent fastener hole 22 is illuminated. By illuminating the fastener hole of interest from the side, the light is not directed directly toward the inspector's eyes, which might blind the inspector to defects in the hole as well as potentially causing damage to the inspector's vision. This is of particular importance where light source 28 may incorporate a laser light source.

Figure 8:
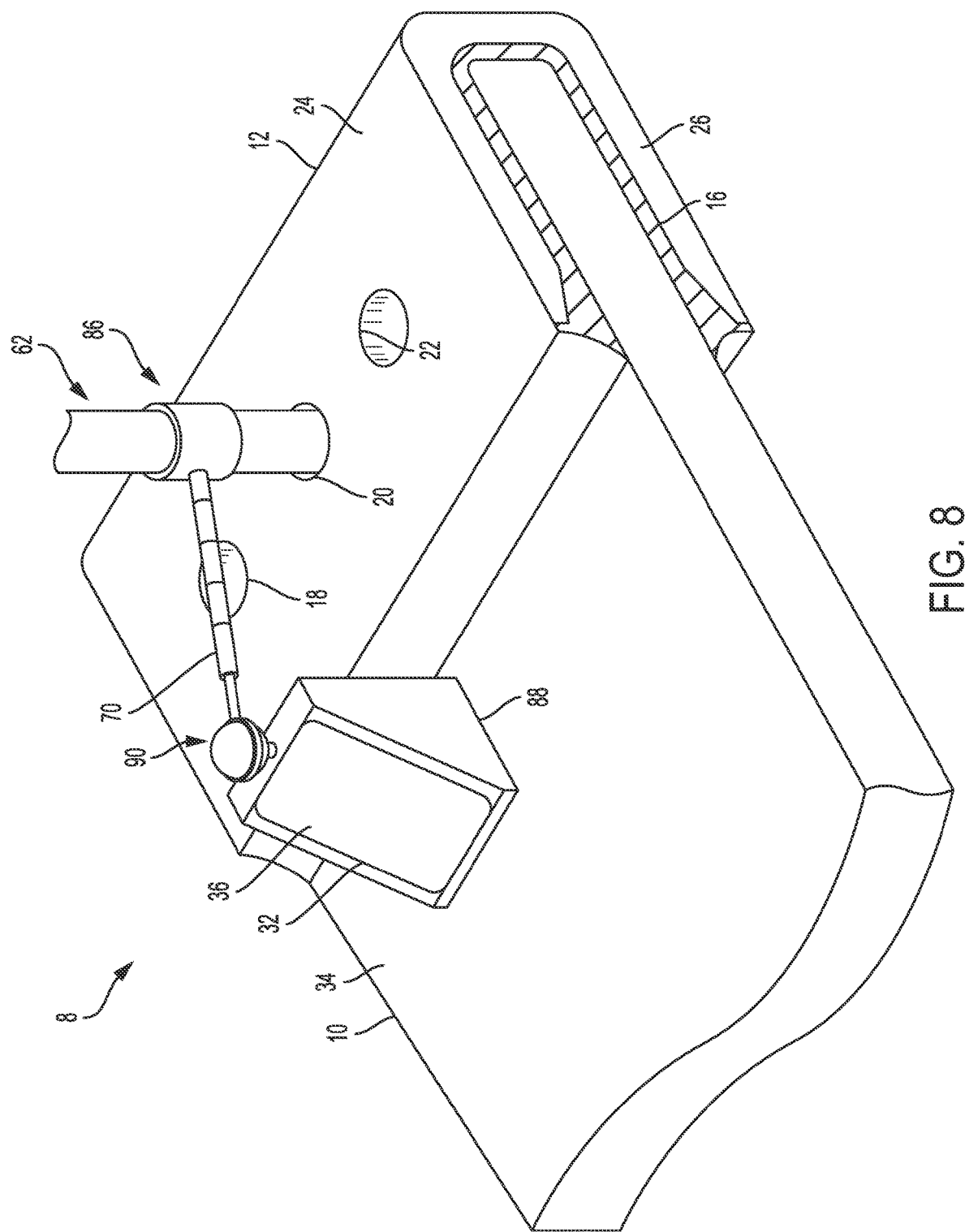
FIG. 8 depicts the apparatus of FIG. 7 in a first position on the object of manufacture of FIG. 1.
Figure 9:
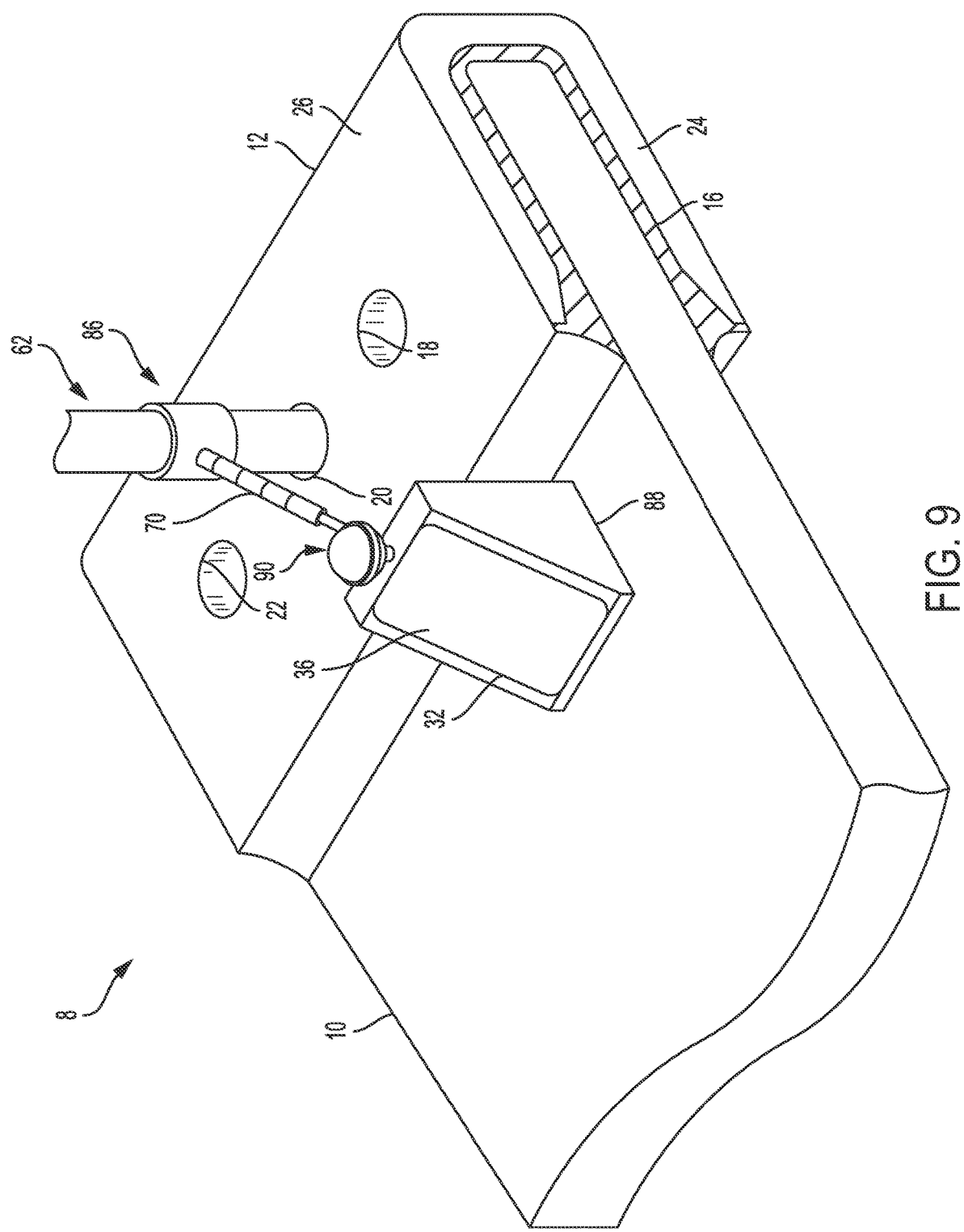
FIG. 9 depicts the apparatus of FIG. 7 in a second position on the object of manufacture of FIG. 1

FIG. 8 depicts apparatus 60 in combination with panel 8, which is disposed so that first side 24 of rail 12 is facing upwards. As shown, sleeve 62 of apparatus 60 is inserted within fastener hole 20, and prism 32 is placed in a first position adjacent to neighboring hole 18 so that light source 28 may be used to illuminate a first portion of the machined inner surface of hole 18. In order to ensure inspection of the entire machined surface of hole 18, panel 8 is then rotated so that second side 26 of rail 12 is facing upwards, as shown in FIG. 9. Prism 32 is then placed in a second position adjacent to neighboring hole 18 (which is now disposed to the right of hole 20) and light source 28 is used to illuminate a second portion of the machined inner surface of hole 18. In this way an adequate inspection of the inner surface of the hole under examination is facilitated.

Figure 10:
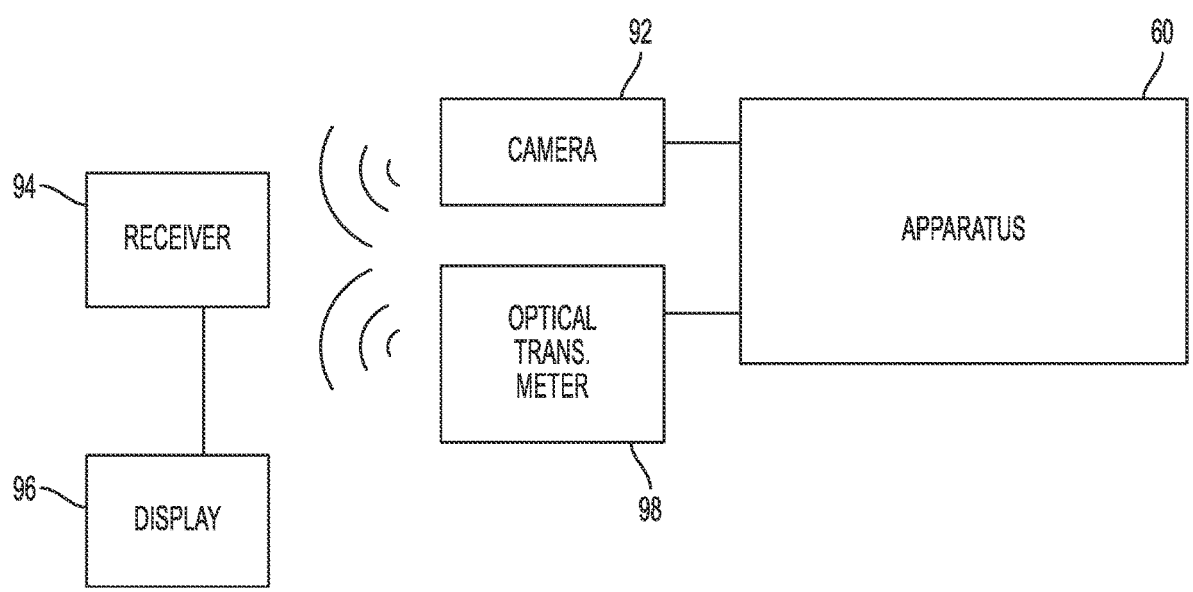
FIG. 10 is a schematic illustration of an illustrative apparatus of the present disclosure.

Apparatus 60 may optionally further include additional features selected to enhance the effectiveness of inspections carried out using the apparatus, as depicted schematically in FIG. 10. For example, apparatus 60 may further include a camera 92 or similar image capture device, or sensor, where camera 92 may be configured to capture one or more images of the viewing face 36 of prism 32, and in particular to capture a plurality of images of light transmitted from light source 28 through at least a portion of the machined surface of a hole, and thereupon through the prism 32 to be viewable on viewing face 36. Camera 92 may be further configured to transmit the plurality of images to a receiver 94.

Apparatus 60 may optionally further include a display device 96 that may be configured to display the plurality of images recorded by camera 92 of viewing face 36 and subsequently transmitted to receiver 94. Typically, display device 96 may be configured so that it is spaced apart from camera 92 and panel 8 when sleeve 62 has been received by the first fastener hole.

Apparatus 60 may optionally further include an optical transmission meter 98, where optical transmission meter 98 may be configured to measure the light transmitted from light source 28 through at least a portion of the machined surface of a hole, and thereupon through the prism 32 to be viewable on viewing face 36. Optical transmission meter 98 may additionally and independently be configured to transmit the measured light transmission measurements to an associated display device 96 via receiver 94.

In order to facilitate automated operation of apparatus 60, the apparatus may include one or more mechanisms for moving the adjustable components of the apparatus. For example, one or more of arm 70, second sleeve portion 68 with cut-out light port 64, translation mechanism 86, and adjustable coupling mechanism 90 for clamp 88 may include a motor and gear assembly or other mechanism configured to adjust the positioning of the components of apparatus 60. In particular, adjustable coupling mechanism 90 may further include a coupling motor 100 and a coupling gear assembly 102 to assist in positioning prism 32.

Example 2

This example describes an illustrative automated system configured to operate a hole inspection apparatus as described above.

Figure 11:
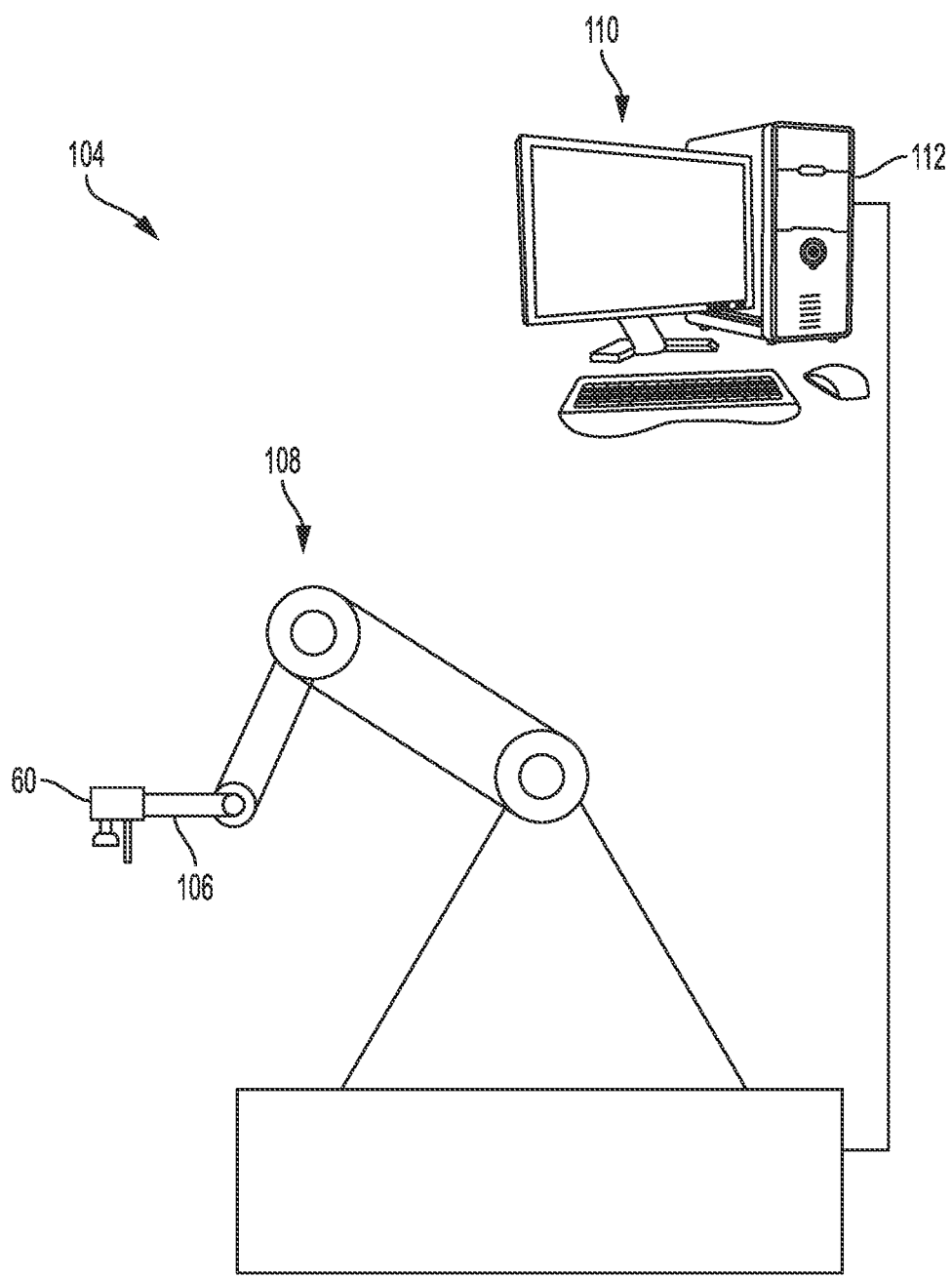
FIG. 11 is a semi-schematic representation of an illustrative automated system according to the present disclosure.

Illustrative apparatus 60 may be a component of an automated system 104, as depicted schematically in FIG. 11. Automated system 104 may include an apparatus 60 that may be coupled to an end-effector 106 of a robotic arm assembly 108, where the robotic arm assembly 108 is capable of moving apparatus 60 to a series of machined holes in an object of manufacture such as panel 8, inserting sleeve 62 with light source 28 into a first fastener hole, and placing prism 32 in a first position adjacent to a second neighboring hole so that light source 28 may be used to illuminate a first portion of the machined inner surface of the second hole. Automated system 104 may further be configured to place prism 32 in a second position adjacent to the second neighboring hole and illuminate a second portion of the machined inner surface of the second neighboring hole.

Automated system 104 may be used in conjunction with a user, who may observe the images shown on viewing face 36 of prism 32 and evaluate the inspected holes for evidence of crazing. The user may observe viewing face 36 directly, or may view prism 32 via associated camera 92, optical transmission meter 98, receiver 94, and/or display device 96. Alternatively, automated system 104 may be configured to operate autonomously and perform the inspection method without user intervention.

Robotic arm assembly 108 may, in turn, be coupled to, and operated by, a control system, such as computer 110, including one or more processors 112. Processor 112 may include software corresponding to a user interface, where the user interface permits an operator to program automated system 104 to execute the desired sequence of movements and operations required to identify and designate each of a series of machined fastener holes, to move apparatus 60 from designated machined fastener hole to designated machined fastener hole, and to inspect the inner surface of each designated machined fastener hole via illumination through a neighboring fastener hole, as described in the present disclosure. The user interface may accept inputs such as, for example, the dimensions of the object of manufacture, the location of each hole to be designated and inspected, the diameter and/or depth of each designated hole, and the length and diameter of sleeve 62, for example. The user interface may be configured so that the parameters for the inspection of the machined fastener holes is specified by the operator. Alternatively, the user interface may permit an operator to simply input a series of defining parameters, such as for example the dimensions of the workpiece, including the coordinates of each machined fastener hole to be inspected, as inputs, and the user interface may then create an appropriate hole inspection pattern to satisfactorily inspect each designated machined hole of the object of manufacture.

Various aspects of the user interface, as well as the operating software to control the robotic assembly, may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

Instructions for an operating system, applications, and/or programs may be located in one or more storage devices in communication with the one or more processor units through a communications framework. The instructions may be in a functional form on a persistent storage. These instructions may be loaded into a memory for execution by processor 112.

These instructions may be referred to as program instructions, program code, computer usable program code, or computer readable program code that may be read and executed by processor 112. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these. Computer program code for carrying out operations for aspects of the present disclosure may be written in any appropriate programming language. The program code may be written in a programming language intended for the robotic system being controlled, such as for example the TPP and KAREL programming languages that are useful for FANUC robotic systems. Alternatively or in addition, the program code may include any of a variety of programming languages, including object-oriented programming languages (such as Java, Smalltalk, C++, and/or the like), or conventional procedural programming languages (such as the C programming language, among others). The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts described herein and/or specified in flowchart 90. Any description, flowchart, or drawing in the present disclosure is intended to illustrate the architecture, functionality, and/or operation of possible implementations of systems, methods, and computer program products according to aspects of the present disclosure.

Example 3

This section describes additional aspects and features of the disclosed methods of inspecting a machined hole, apparatus for inspecting a machined hole, and systems for inspecting machined holes, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A method, comprising:

positioning a light source in a first hole defined by an object of manufacture having a transparent material at least partially enclosed in one or more substantially opaque materials;

directing light from the positioned light source through the transparent material and toward a second hole defined by the object of manufacture that is adjacent to the first hole, the second hole defined by a machined inner surface;

positioning a prism having a viewing face adjacent to the transparent material, such that light transmitted from the light source through the machined inner surface of the second hole is visible through the viewing face of the prism;

observing the transmitted light; and determining a surface condition of the machined inner surface of the second hole based on the observed light transmitted through the viewing face.

A2. The method of paragraph A1, wherein observing light transmitted from the light source includes measuring a percentage of light transmitted from the light source through the machined surface of the second hole and through the viewing face.

A3. The method of paragraph A2, wherein determining a surface condition of the machined surface includes determining a crazing condition of the machined surface of the second hole when the measured percentage of light transmitted from the light source through the machined surface of the second hole and through the viewing face is outside a predetermined acceptable range.

A4. The method of any of paragraphs A1-A3, wherein positioning a light source in a first hole includes positioning a borescope having the light source in the first fastener hole.

A5. The method of paragraph A4, wherein directing light from the light source includes directing light from the light source of the borescope through the transparent material and toward the second hole.

A6. The method of any of paragraphs A1-A5, wherein positioning a light source in a first hole includes positioning an illumination light pipe having the light source in the first hole.

A7. The method of paragraph A6, wherein directing light from the light source includes directing light from the light source of the illumination light pipe through the transparent material and toward the second hole.

A8. The method of any of paragraphs A1-A7, wherein positioning the light source in the first hole include positioning a laser device in the first hole.

A9. The method of paragraph A8, wherein directing light from the light source includes directing light from the laser device through the transparent material and toward the second hole.

A10. The method of any of paragraphs A1-A9, wherein positioning the prism adjacent to the transparent material includes positioning the prism adjacent to the second hole.

A11. The method of paragraph A10, wherein positioning the prism adjacent to the transparent material includes selecting a prism with angles suitable to view the light transmitted from the light source through the machined surface of the second hole and through the viewing face.

A12. The method of any of paragraphs A1-A11, wherein positioning the prism adjacent to the transparent material includes positioning the prism in a first location adjacent to the second hole.

A13. The method of paragraph A12, wherein observing light transmitted from the light source includes observing light transmitted from the light source through a first portion of the machined surface of the second hole and through the viewing face when the prism is in the first location.

A14. The method of paragraph A13, wherein positioning a prism adjacent to the second hole further includes positioning the prism in a second location adjacent to the second hole, the second location being different from the first location.

A15. The method of paragraph A14, wherein observing light transmitted from the light source further includes observing light transmitted from the light source through a second portion of the machined surface of the second hole and through the viewing face when the prism is in the second location, the second portion being different from the first portion.

A16. The method of paragraph A15, wherein the first and second portions define the machined surface of the second fastener hole.

A17. The method of any of paragraphs A1-A16, wherein each of the first hole and the second hole are configured to receive a fastener.

B1. An apparatus, comprising:
a sleeve sized to be received in a first fastener hole of an object of manufacture having a transparent material at least partially enclosed in one or more substantially opaque materials, the sleeve having a hollow portion sized to receive a light source, the sleeve further including a cut-out portion configured, when the sleeve is received in the first fastener hole and the light source is received in the hollow portion, to direct light from the light source through the transparent material and toward a second fastener hole that is adjacent to the first fastener hole, the second fastener hole defined by a machined surface; and
an adjustable arm having first and second end portions, the first end portion is connected to the sleeve and the second end portion being configured to support a viewing prism having a viewing face such that light transmitted from the light source goes through at least a portion of the machined surface of the second fastener hole and through the viewing face when the sleeve is received in the first fastener hole, the light source is received in the hollow portion, and the prism is disposed adjacent the transparent material.

B2. The apparatus of paragraph B1, wherein the sleeve includes first and second portions, the first end portion of the adjustable arm is connected to the first portion of the sleeve, and the second portion of the sleeve includes the cut-out portion, wherein the first portion is configured to pivot relative to the second portion.

B3. The apparatus of paragraph B2, wherein the first and second portions are discrete from each other.

B4. The apparatus of paragraph B3, wherein the first portion includes an aperture sized to receive a first fastener to secure the received light source to the first portion B5. The apparatus of paragraph B4, wherein the second portion includes an aperture sized to receive a second fastener to secure the light source to the second portion.

B6. The apparatus of any of paragraphs B1-B5, where the hollow portion of the sleeve defines a longitudinal axis, wherein the adjustable arm is a telescopically extendable and retractable arm that extends and retracts along an axis perpendicular to the longitudinal axis.

B7. The apparatus of paragraph B6, wherein the arm includes a plurality of telescoping tube members of decreasing diameter.

B8. The apparatus of any of paragraphs B1-B7 where the hollow portion of the sleeve defines a first longitudinal axis, and wherein the second end portion includes a clamp configured to grasp the viewing prism such that the light transmitted from the light source goes through the at least a portion of the machined surface and through the viewing face when the sleeve is received in the first fastener hole and the light source is received in the hollow portion, the clamp is configured to rotate relative to the first end portion of the adjustable arm and about a second longitudinal axis that is parallel to the first longitudinal axis.

B9. The apparatus of paragraph B8, further comprising a motor and a gear assembly configured to move the clamp about the second longitudinal axis.

B10. The apparatus of any of paragraphs B1-B9, wherein the hollow portion is sized to receive a borescope, and the cut-out portion is configured to direct light from the borescope through the transparent material and toward the second fastener hole.

B11. The apparatus of any of paragraphs B1-610, wherein the hollow portion is sized to receive an illumination light pipe, and the cut-out portion is configured to direct light from the illumination light pipe through the transparent material and toward the second fastener hole.

B12. The apparatus of any of paragraphs B1-611, wherein the hollow portion is sized to receive a laser device, and the cut-out portion is configured to direct laser from the laser device through the transparent material and toward the second fastener hole.

B13. The apparatus of any of paragraphs B1-612, further comprising a camera attached to the second end portion and configured to capture a plurality of images of the light transmitted from the light source through the at least a portion of the machined surface and through the viewing face.

B14. The apparatus of paragraph B13, further comprising a display configured to display the plurality of images of the viewing face, the display being spaced from the camera and the object of manufacture when the sleeve is received in the first fastener hole.

B15. The apparatus of paragraph B14, wherein the camera is configured to transmit the plurality of images to a receiver.

B16. The apparatus of paragraph B14, further comprising an optical transmission meter configured to measure the light transmitted from the light source through the at least a portion of the machined surface and through the viewing face.

B17 The apparatus of paragraph B16, wherein the optical transmission meter is configured to transmit the light transmission measurements to the display.

C1. A system, comprising:
 a robotic arm;
 a controller assembly configured to control the robotic arm; and
 an inspection apparatus attached to the robotic arm, the inspection apparatus comprising:
  a sleeve sized to be received in a first fastener hole of an object of manufacture having a transparent material at least partially enclosed in one or more substantially opaque materials, the sleeve having a hollow portion sized to receive a light source, the sleeve further including a cut-out portion configured, when the sleeve is received in the first fastener hole and the light source is received in the hollow portion, to direct light from the light source through the transparent material and toward a second fastener hole that is adjacent to the first fastener hole, the second fastener hole defined by a machined surface;
  a light source positioned in the hollow portion of the sleeve;
  an arm having first and second end portions, the first end portion is connected to the sleeve and the second end portion being configured to support a viewing prism having a viewing face such that the viewing prism is disposed adjacent the transparent material when the sleeve is received in the first fastener hole; and
  a viewing prism supported by the second end portion of the arm, wherein light transmitted from the light source goes through at least a portion of the machined surface of the second fastener hole and through the viewing face when the sleeve is received in the first fastener hole.

C2. The system of paragraph C1, wherein the controller assembly is configured to insert the sleeve into the first fastener hole via the robotic arm.

C3. The system of paragraph C2, wherein the arm is adjustable by the controller assembly, and wherein the controller assembly is configured to position the prism adjacent the second fastener hole such that light transmitted from the light source goes through at least a portion of the machined surface of the second fastener hole and through the viewing face.

C4. The system of any of paragraphs C1-C3, further comprising a camera configured to acquire a plurality of images from the viewing face of the prism, wherein the controller assembly is configured to activate the camera when the sleeve is inserted into the first fastener hole and the prism is positioned adjacent the transparent material.

C5. The system of paragraph C4, further comprising a display configured to receive the acquired plurality of images and display those images.

C6. The system of paragraph C5, further comprising an optical transmission meter configured to measure the percentage of light transmitted from the light source through at least a portion of the machined surface of the second fastener hole and through the viewing face.

C7. The system of paragraph C6, wherein the optical transmission meter is configured to transmit the measured percentage of light transmitted to the display, and the display is configured to display the measured percentage of light transmitted.

Advantages, Features, Benefits

The different embodiments and examples of the methods, apparatus, and systems described herein provide several advantages over known solutions for inspecting fastener holes in glassy materials that may exhibit crazing after machining.

Illustrative embodiments and examples of the methods, apparatus, and systems described herein permit a rapid and inexpensive means of detecting crazing in machined holes, even where the hole may not be directly observable. Additionally, the present method may provide a more definitive identification of crazing in test samples than previous optical methods.

Furthermore, the disclosed method and apparatus lend themselves to automation, such that the resulting manufacturing process would requires shorter cycle times and the quality of the product would improve.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A method, comprising:
 positioning a light source in a first hole defined by an object of manufacture having a transparent material at least partially enclosed in one or more substantially opaque materials;

directing light from the positioned light source through the transparent material and toward a second hole defined by the object of manufacture that is adjacent to the first hole, the second hole defined by a machined inner surface;

positioning a prism having a viewing face adjacent to the transparent material, such that light transmitted from the light source through the machined inner surface of the second hole is visible through the viewing face of the prism;

observing the transmitted light; and determining a surface condition of the machined inner surface of the second hole based on the observed light transmitted through the viewing face.

2. The method of claim 1, wherein observing light transmitted from the light source includes measuring a percentage of light transmitted from the light source through the machined inner surface of the second hole and through the viewing face.

3. The method of claim 2, wherein determining a surface condition of the machined inner surface includes determining a crazing condition of the machined inner surface of the second hole when the measured percentage of light transmitted from the light source through the machined inner surface of the second hole and through the viewing face is outside a predetermined acceptable range.

4. The method of claim 1, wherein positioning the light source in the first hole includes positioning at least one of a borescope having the light source, an illumination light pipe having the light source, or a laser device in the first hole.

5. The method of claim 1, wherein positioning the prism adjacent to the transparent material includes positioning the prism adjacent to the second hole.

6. The method of claim 5, wherein positioning the prism adjacent to the transparent material includes selecting a prism with angles suitable to view the light transmitted from the light source through the machined inner surface of the second hole and through the viewing face.

7. The method of claim 6, wherein positioning the prism adjacent to the transparent material includes positioning the prism in a first location adjacent to the second hole;

observing the transmitted light includes observing light transmitted from the light source through a first portion of the machined inner surface of the second hole and through the viewing face when the prism is in the first location;

positioning the prism adjacent to the transparent material further includes positioning the prism in a second location adjacent to the second hole, the second location being different from the first location;

observing the transmitted light further includes observing light transmitted from the light source through a second portion of the machined inner surface of the second hole and through the viewing face when the prism is in the second location; and the second portion of the machined inner surface is different from the first portion of the machined inner surface, and the first and second portions define the machined inner surface of the second hole.

8. An apparatus, comprising:

a sleeve sized to be received in a first fastener hole of an object of manufacture having a transparent material at least partially enclosed in one or more substantially opaque materials, the sleeve having a hollow portion sized to receive a light source, the sleeve further including a cut-out portion configured, when the sleeve is received in the first fastener hole and the light source is received in the hollow portion, to direct light from the light source through the transparent material and toward a second fastener hole that is adjacent to the first fastener hole, the second fastener hole defined by a machined surface; and an adjustable arm having first and second end portions, the first end portion being connected to the sleeve and the second end portion being configured to support a viewing prism having a viewing face such that light transmitted from the light source goes through at least a portion of the machined surface of the second fastener hole and through the viewing face when the sleeve is received in the first fastener hole, the light source is received in the hollow portion, and the prism is disposed adjacent the transparent material.

9. The apparatus of claim 8, wherein the sleeve includes first and second portions that are discrete from each other, where the first end portion of the adjustable arm is connected to the first portion of the sleeve, and the second portion of the sleeve includes the cut-out portion, wherein the first portion is configured to pivot relative to the second portion.

10. The apparatus of claim 8, wherein the hollow portion of the sleeve defines a longitudinal axis, and wherein the adjustable arm is a telescopically extendable and retractable arm that extends and retracts along an axis perpendicular to the longitudinal axis.

11. The apparatus of claim 8, wherein the hollow portion of the sleeve defines a first longitudinal axis, and wherein the second end portion includes a clamp configured to grasp the viewing prism such that the light transmitted from the light source goes through the at least a portion of the machined surface and through the viewing face when the sleeve is received in the first fastener hole and the light source is received in the hollow portion, the clamp is configured to rotate relative to the first end portion of the adjustable arm and about a second longitudinal axis that is parallel to the first longitudinal axis.

12. The apparatus of claim 8, wherein the hollow portion is sized to receive at least one of a borescope, an illumination light pipe, or a laser device and the cut-out portion is configured to direct light from the borescope, light pipe, or laser device through the transparent material and toward the second fastener hole.

13. The apparatus of claim 8, further comprising a camera attached to the second end portion and configured to capture a plurality of images of the light transmitted from the light source through the at least a portion of the machined surface and through the viewing face.

14. The apparatus of claim 13, further comprising a display configured to display the plurality of images of the viewing face, the display being spaced from the camera and the object of manufacture when the sleeve is received in the first fastener hole.

15. The apparatus of claim 14, wherein the camera is configured to transmit the plurality of images to the display.

16. The apparatus of claim 14, further comprising an optical transmission meter configured to measure the light transmitted from the light source through the at least a portion of the machined surface and through the viewing face.

17. The apparatus of claim 16, wherein the optical transmission meter is configured to transmit the light transmission measurements to the display.

18. A system, comprising:

a robotic arm;

a controller assembly configured to control the robotic arm; and an inspection apparatus attached to the robotic arm, the inspection apparatus comprising:

a sleeve sized to be received in a first fastener hole of an object of manufacture having a transparent material at least partially enclosed in one or more substantially opaque materials, the sleeve having a hollow portion sized to receive a light source, the sleeve further including a cut-out portion configured, when the sleeve is received in the first fastener hole and the light source is received in the hollow portion, to direct light from the light source through the transparent material and toward a second fastener hole that is adjacent to the first fastener hole, the second fastener hole defined by a machined surface;

a light source positioned in the hollow portion of the sleeve;

an arm having first and second end portions, the first end portion being connected to the sleeve and the second end portion being configured to support a viewing prism having a viewing face such that the viewing prism is disposed adjacent the transparent material when the sleeve is received in the first fastener hole; and a viewing prism supported by the second end portion of the arm, wherein light transmitted from the light source goes through at least a portion of the machined surface of the second fastener hole and through the viewing face when the sleeve is received in the first fastener hole.

19. The system of claim 18, wherein the controller assembly is configured to insert the sleeve into the first fastener hole via the robotic arm.

20. The system of claim 19, further comprising a camera configured to acquire a plurality of images from the viewing face of the prism, and wherein the controller assembly is configured to activate the camera when the sleeve is inserted into the first fastener hole.

21. The system of claim 20, further comprising:

a display configured to receive the acquired plurality of images and display those images; and an optical transmission meter configured to measure the percentage of light transmitted from the light source through the at least a portion of the machined surface of the second fastener hole and through the viewing face, and to transmit the measured percentage of light transmitted to the display;

wherein the display is configured to display the measured percentage of light transmitted.

* * * * *